(12) United States Patent
Nakamura et al.

(10) Patent No.: US 7,830,807 B2
(45) Date of Patent: *Nov. 9, 2010

(54) FAULT ISOLATION SYSTEM AND METHOD

(75) Inventors: Neal Y. Nakamura, Honolulu, HI (US);
Earl M. Ishihara, Mililani, HI (US)

(73) Assignee: Time Warner Cable, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/496,691

(22) Filed: Jul. 2, 2009

(65) Prior Publication Data

US 2009/0268618 A1    Oct. 29, 2009

Related U.S. Application Data

(63) Continuation of application No. 12/023,078, filed on Jan. 31, 2008, now Pat. No. 7,573,828, which is a continuation of application No. 11/040,391, filed on Jan. 21, 2005, now Pat. No. 7,366,102.

(51) Int. Cl.
*H04L 12/26* (2006.01)

(52) U.S. Cl. ............................... 370/244; 370/250
(58) Field of Classification Search .................. None
See application file for complete search history.

(56) References Cited

U.S. PATENT DOCUMENTS 5,519,830 A  *  5/1996  Opoczynski ............... 714/4
6,272,150 B1     8/2001  Hrastar et al.

* cited by examiner

*Primary Examiner*—Gregory B Sefcheck
*Assistant Examiner*—Nima Mahmoudzadeh
(74) *Attorney, Agent, or Firm*—The Marbury Law Group, PLLC

(57) ABSTRACT

A fault isolation system and method. A hierarchical numbering system is applied to devices within a subscriber network. The number system comprises a continuously concatenated string that provides a relative location of each active device with a subscriber network. The numbering system provides "genealogical" information about network devices and their location with the network and facilitates the correlation of non-responsive CPE data with faults in network devices.

18 Claims, 8 Drawing Sheets

FAULT ISOLATION SYSTEM AND METHOD

RELATIONSHIP TO OTHER APPLICATIONS

This application is a continuation of U.S. application Ser. No. 12/023,078 filed Jan. 31, 2008, now U.S. Pat. No. 7,573,828, which is a continuation of U.S. application Ser. No. 11/040,391, now U.S. Pat. No. 7,366,102, filed Jan. 21, 2005, now incorporated by reference in their entireties for all purposes.

BACKGROUND

Subscriber networks deliver voice, data, and video to subscribers over a complex web of hubs, nodes, amplifiers, and passive devices. Fiber-based networks may utilize multiple splices to provide connectivity to subscribers. Network management practices typically include device numbering systems to facilitate network topographical management. Device numbering systems are hierarchical thereby mimicking the trunk/cascade structure of the network itself. A well-implemented numbering system provides information about the physical location of a particular device within a network and the other devices to which the particular device connects.

Device numbering systems are generally designed to identify a device within a network to a level within the network deemed useful for network management. That is, a numbering system is used to manage network traffic, schedule maintenance, identify available capacity, balance loads among devices, and other important tasks. However, such a device numbering system is not able to isolate network problems to a device or cascade level.

FIG. 1 illustrates a typical cable-based system architecture. A headend 100 communicates with hub 105. Hub 105 communicates with nodes 110A, 110B and 110C. Nodes 110 provide an interface between the fiber-based transport medium of the cable network (between the headend 100 and upstream side of nodes 110) and the coax-based medium (between the downstream side of nodes 110 and the subscriber interface 145). The downstream side of node 110B is further illustrated as connecting to amplifier 1 125 which in turn is connected to amplifier 2 130. The serial path from node 120B through amplifier 1 125 to amplifier 2 130 is referred to as a cascade relative to node 120B. Amplifier 1 125 has three branches that are cascades relative to amplifier 1 125 and sub-cascades relative to node 120B.

As will be appreciated by those skilled in the art, FIG. 1 is a greatly simplified schematic of a cable network architecture. A hub typically serves 20,000 subscribers. A typical hub may support 100 nodes with each node capable of serving 2000 subscribers. In order to maintain signal quality and quality of service commitments, trunk amplifiers maintain high signal quality. Internal bridger modules in the trunk amplifiers may be used to boost signals for delivery to subscribers' homes. Line Extender amplifiers maintain the high signal levels in cascade after the trunk amplifiers, through the neighborhoods. Taps divide out small amounts of signal for connection to the homes. A tap typically has 2, 4 or 8 ports for connection of drop cables. Nominal cascade limits are up to 4 trunk amplifiers followed by up to 3 line extenders, with more in very rural areas. In suburban areas, cascades typically comprise 2 trunk and 2 line extenders. Because branching is unlimited, the total device count per node may be large despite short cascades.

In addition, cable-based systems may have tap configurations that result in many ports emanating from a single cascade. Fiber-based systems may have multiple splices to provide connectivity to subscribers.

Because of the number of devices and branches in a subscriber network, identifying the cause of an outage can be a daunting problem. Subscriber network troubleshooting is often time consuming and craft/skill dependent in a sequence of staff positions. Customer service must interpret and correlate customer complaints, dispatch must efficiently contact and direct the maintenance crew, and the maintenance crew must efficiently troubleshoot a geographically dispersed system.

SUMMARY

Embodiments provide methods and systems for isolating faults in subscriber network equipment located within subscriber network segment. In various embodiments, a "last active device" or "LAD" hierarchical numbering system is applied to the active devices within the subscriber network.

In a left-to-right numbering system, a number string may be segmented using a character or characters to indicate a transition from one system to another. By way of illustration and not as a limitation, in cable network, numbers are assigned to components of a trunking system (for example, hubs, nodes, amplifiers). When the trunking system connects to a distribution system component (for example, a line extender), a separator is introduced before the distribution system component number. Similarly, when the distribution system connects to a passive device (for example, taps, splitters, directional couplers and power inserters), another separator is introduced. In an embodiment, the separator indicating a transition from a trunking system component to a distribution system component is a single decimal point (.), and the separator indicating a transition from a distribution system component to a passive component is a double decimal point (..).

If the architecture contains no trunk/distribution systems, only active and passive devices (for example, a Fiber-To-The-Home (FTTH) system), only a single transition will occur. In such systems, only a single separator may be used. In other networks in which the architecture is not so well defined, rules governing the use of separators may be established to best facilitate a fault resolution process.

In an embodiment, a hub is assigned a hub identifier. Each node that connects to a hub is assigned an identifier comprising a unique node identifier concatenated with the hub identifier of the hub to which the node is connected. Each amplifier that connects to a node is represented by an identifier comprising a cascade and amplifier identifier concatenated with the node identifier of the node to which the amplifier is connected. Successive downstream amplifiers in the cascade are indicated by concatenating the nearest upstream amplifier identifier with the downstream amplifier identifier.

A line extender (or "LE") in a cascade is indicated by a character such as a decimal. The LE is represented by an identifier comprising an LE identifier concatenated with the amplifier identifier using the character (such as a decimal point) as a separator. The numbering system is indeterminate allowing the identification of devices to the subscriber termination. The inventory of network devices is associated in a data structure with the assigned identification number.

Fault isolation is accomplished by in an automated fashion by a processor that executes instructions stored on an appropriate media. By of illustration and not as a limitation, the media may be a hard drive, non-volatile memory, a cd-rom, and magnetic media. The instructions cause the processor to correlate fault data with subscribers with network devices common to those subscribers affected by a fault. For example, when communication with a particular customer premises equipment (CPE) is lost, a last active device identifier is queried from a database. When some critical mass of correlated accounts disappears from the network, action may be taken with respect to a particular network device.

Each device in the subscriber network is assigned an identification number and each subscriber account is assigned the identification of an appropriate connecting device. When a degradation or loss of data connections with customer premise devices such as subscriber modems and digital set top boxes occur, the device identifiers of the subscribers are grouped by hub and node and sorted. The sorting process causes the first common point of failure to move to the top of the group. The identification number may then be searched in the engineering database for location, description and mapping information for the field crew to act upon.

Components of a network may be numbered automatically. A processor executes instructions stored on an appropriate media. By of illustration and not as a limitation, the media may be a hard drive, non-volatile memory, a cd-rom, and magnetic media. The instructions cause the processor to access network data in a datastore, to "walk" down a network cascade emanating from a hub, to identify a network component, and assign a component a device identifier until it reaches the end of the cascade. From the end of the cascade, the instructions cause the processor to "walk" up the cascade until an unmarked branch is reached. The process continues until all components in the network are assigned device identifiers.

DETAILED DESCRIPTION

Figure 1:
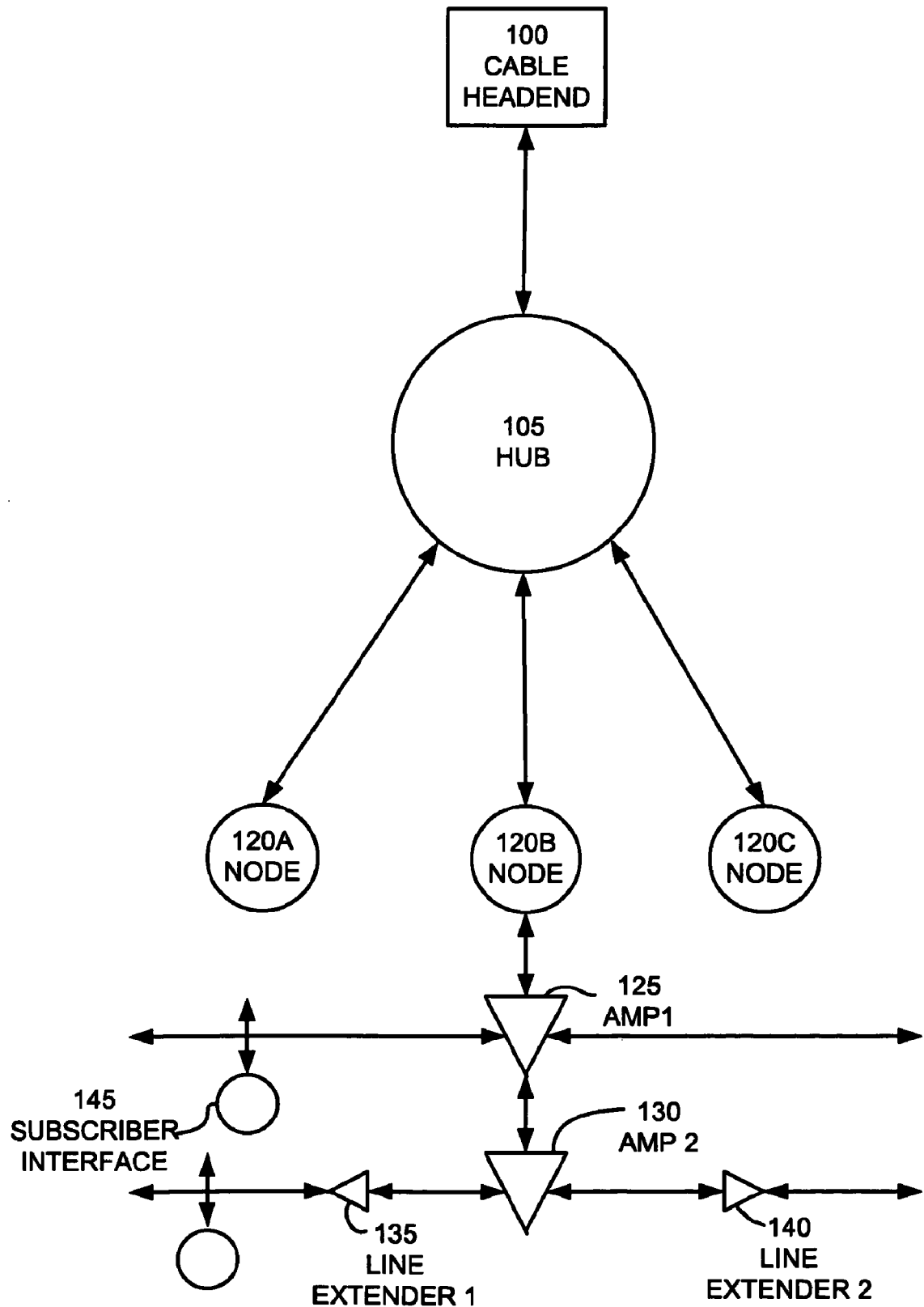
FIG. 1 illustrates a typical subscriber network architecture.

The following terms are used in the description that follows. The definitions are provided for clarity of understanding:

&—Concatenation function.

Trunk Amplifier—Trunk amplifiers amplify and reamplify signals for transmission (RF in a HFC network and light in a fiber-to-the-home network) through a subscriber network and out to the distribution system.

Cascade—A serial path extending from an active device.

Hub—The local source of subscriber services. By way of illustration and not as a limitation, a hub may serve 20,000 subscribers.

Hybrid Fiber Coax (HFC)—A network design that employs both fiber optic and coaxial subscribers to deliver voice, video and data services to subscribers.

Line extender—An amplifier that reamplifies the signal from the Trunk amplifier in an HFC network. Taps that provide the subscriber connections to the homes are installed in the distribution cabling between the Trunk amplifiers and the line extenders.

Node—A device that provides an interface between the fiber optic and coaxial subscriber systems of an HFC subscriber system. Light from a fiber optic subscriber is converted into an electrical signal suitable for delivery in a coaxial subscriber system within this device.

Tap—A passive device that divides out small amounts of signal for connection to the homes. They typically have 2, 4 or 8 ports for connection of drop subscribers.

An embodiment provides a method for isolating faults in cable network equipment located within cable network segment. In this embodiment, a "last active device" or "LAD" hierarchical numbering system is applied to the active devices within the cable network. A hub is assigned a hub identifier. Each node that connects to a hub is assigned an identifier comprising a unique node identifier concatenated with the hub identifier of the hub to which the node is connected. Each amplifier that connects to a node is represented by an identifier comprising a cascade and amplifier identifier concatenated with the node identifier of the node to which the amplifier is connected. Successive downstream amplifiers in the cascade are indicated by concatenating the nearest upstream amplifier identifier with the downstream amplifier identifier.

A line extender (or "LE") in a cascade is indicated by a decimal. The LE is represented by an identifier comprising an LE identifier concatenated with the amplifier identifier using a character as a separator. In the discussion that follows, the character is a decimal point but this is not meant as a limitation. Other characters may be used to denote the interface between an amplifier and an LE. The numbering system is indeterminate allowing the identification of devices to the subscriber termination.

Fault isolation is accomplished by correlating trouble reports among subscribers with network devices common to those subscribers affected by a fault. Each device in the cable network is assigned an identification number and each subscriber account is assigned the identification of an appropriate connecting device. When a degradation or loss of data connections with customer premise devices such as cable modems and digital set top boxes occur, the device identifiers of the subscribers are grouped by hub and node and sorted. The sorting process causes the first common point of failure to move to the top of the group. The identification number may then be searched in the engineering database for location, description and mapping information for the field crew to act upon.

The number system comprises a continuously concatenated string that provides a relative location of each active device with a cable network.

By way of illustration and not as a limitation, a device identifier may have the form: Hub & Node & Trunk & "." & LE & MDU & "." & Passive, where the "&" signifies concatenation of the identifier of the device to which the identified device is connected.

Figure 2:
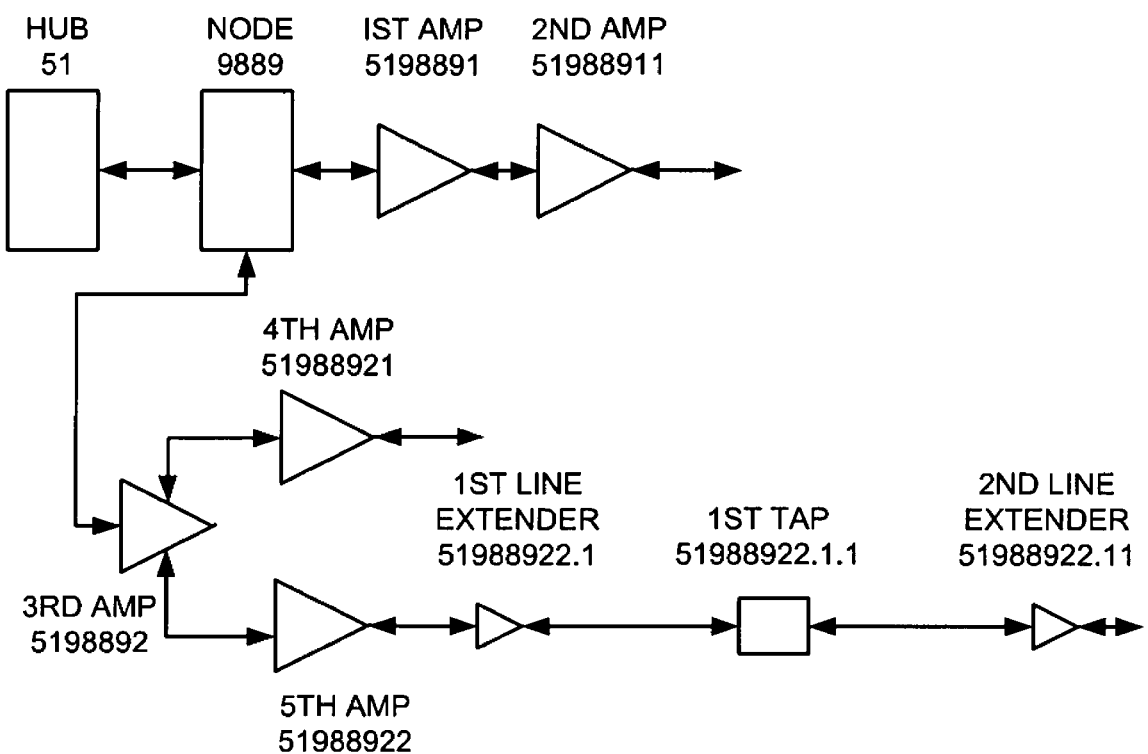
FIG. 2 illustrates a last active device numbering system according to an embodiment.

FIG. 2 illustrates a LAD number system according to an embodiment of the present invention. While FIG. 2 illustrates fields within the device numbering system as having particular length, the present invention is not so limited. As will be appreciated by those skilled in the art, other field lengths may be used without departing from the scope of the present invention. The two left-most character positions identify hub 51. The next 4 positions identify the node and serving area 9889. Each subsequent place to the right indicates the amplifier cascade position. As illustrated in FIG. 2, there are two amplifiers cascaded with node 9889. An amplifier connects to node 9889 and is identified with a "1" to signify that it is the first split, or cascade, from the node. The first amplifier receives the device identifier 5198891 (selective bolding used for clarity). A second amplifier connects to the first amplifier and is identified with a cascade number (relative to the first amplifier) of "1". The second amplifier thus receives the identifier 51988911 (selective bolding used for clarity), where the first bolded "1" indicates that the second amplifier is in the first cascade relative to node 9889 and the second bolded "1" indicates that the second amplifier is in the first cascade relative to the first amplifier. A third amplifier also connects to node 9889 and is identified with a cascade number of "2" to signify that is the second cascade from the node. The third amplifier receives the device identifier 5198892 (selective bolding used for clarity). A fourth amplifier and a fifth amplifier are connected to the third amplifier. The fourth amplifier is identified with a cascade number of "1" (relative to the third amplifier) and receives the identifier 51988921 (selective bolding used for clarity). The fifth amplifier is identified with a cascade number of "2" (relative to the third amplifier) and receives the device identifier 51988922 (selective bolding used for clarity). An amplifier connected to either the fourth or fifth amplifier would be identified by a cascade number of "1" and a device identifier constructed by concatenating the cascade number with the device identifier of the device upstream from it.

A first line extender is connected to the fifth amplifier 51988922. The first line extender receives a device identifier constructed by inserting a separator after the first amplifier identifier, identifying the first line extender by a "1," and concatenating the "1" with the first amplifier device identifier. As illustrated in FIG. 2, the separator is a "decimal" point. However, the present invention is not so limited. Any computer recognized non-numerical character may be used as separator without departing from the scope hereof. Referring again to FIG. 2, the first line extender receives a device identifier of 51988922.1. A tap, a passive device, is connected to first line extender 51988922.1. A second separator is used to identify a passive interface. The tap receives a device identifier of 51988922.1.1 (selective bolding used for clarity). A second line extender is connected to the tap and receives a cascade number of "1." The second line extender receives a device identifier of 51988922.11 (selective bolding used for clarity). The second line extender is an active device and is part of the distribution system. This relationship is signified by a single dot.

The "genealogy" of an active device can be traced by parsing the device identifier backwards (or upstream). For example, line extender 51988922.11 is connected to:

cascade number 1 of line extender 51988922.1, which is connected to cascade number 1 of amplifier 51988922, which is connected to cascade number 2 of amplifier 5198892, which is connected to cascade number 2 of node 9889 and hub 51.

Figure 5:
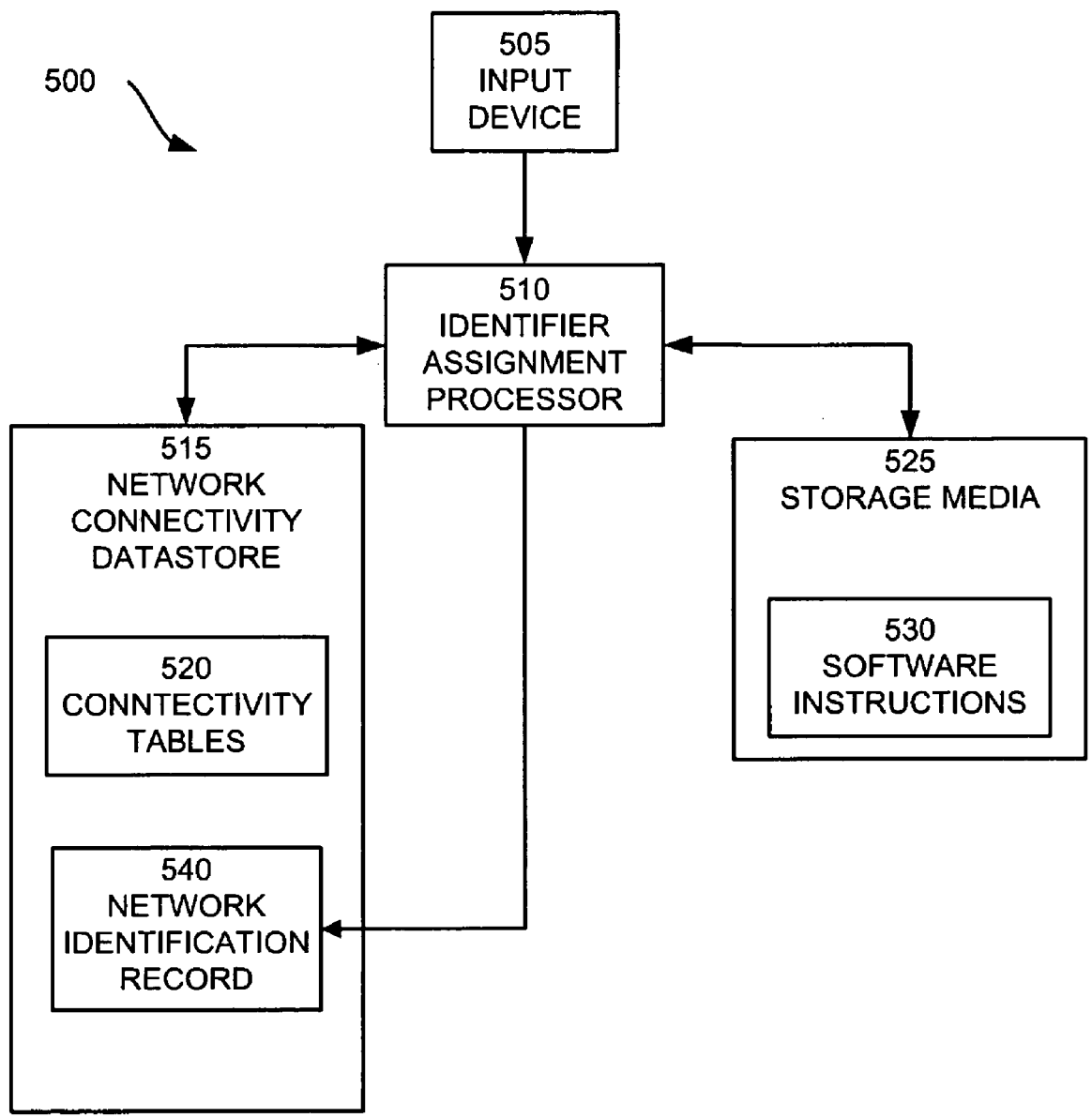
FIG. 5 is a system component diagram illustrating different components of a network device numbering system according an embodiment.

FIG. 5 is a system component diagram illustrating different components of a network device numbering system according an embodiment. A network device numbering system 500 comprises an input device 505, a network connectivity datastore 515 and a storage media 525 connected to an identifier assignment processor 510. The network connectivity datastore 515 comprises connectivity tables 520. The connectivity tables 520 map the connections to devices that are part of a particular cascade emanating from a particular node. The node is selected using input device 505.

The storage media 525 comprises software instructions 530 that may be used to configure the identifier assignment processor 510. By way of illustration and not by way of limitation, the storage media 525 may be a hard drive, non-volatile memory, a cd-rom, and magnetic media.

When configured with the software instructions 530, the identifier assignment processor 510 performs operations to number the network components associated with the selected node. The assigned identifier associated with each network component is added to a network identification record 540 and stored in a network connectivity datastore 515.

Figure 6:
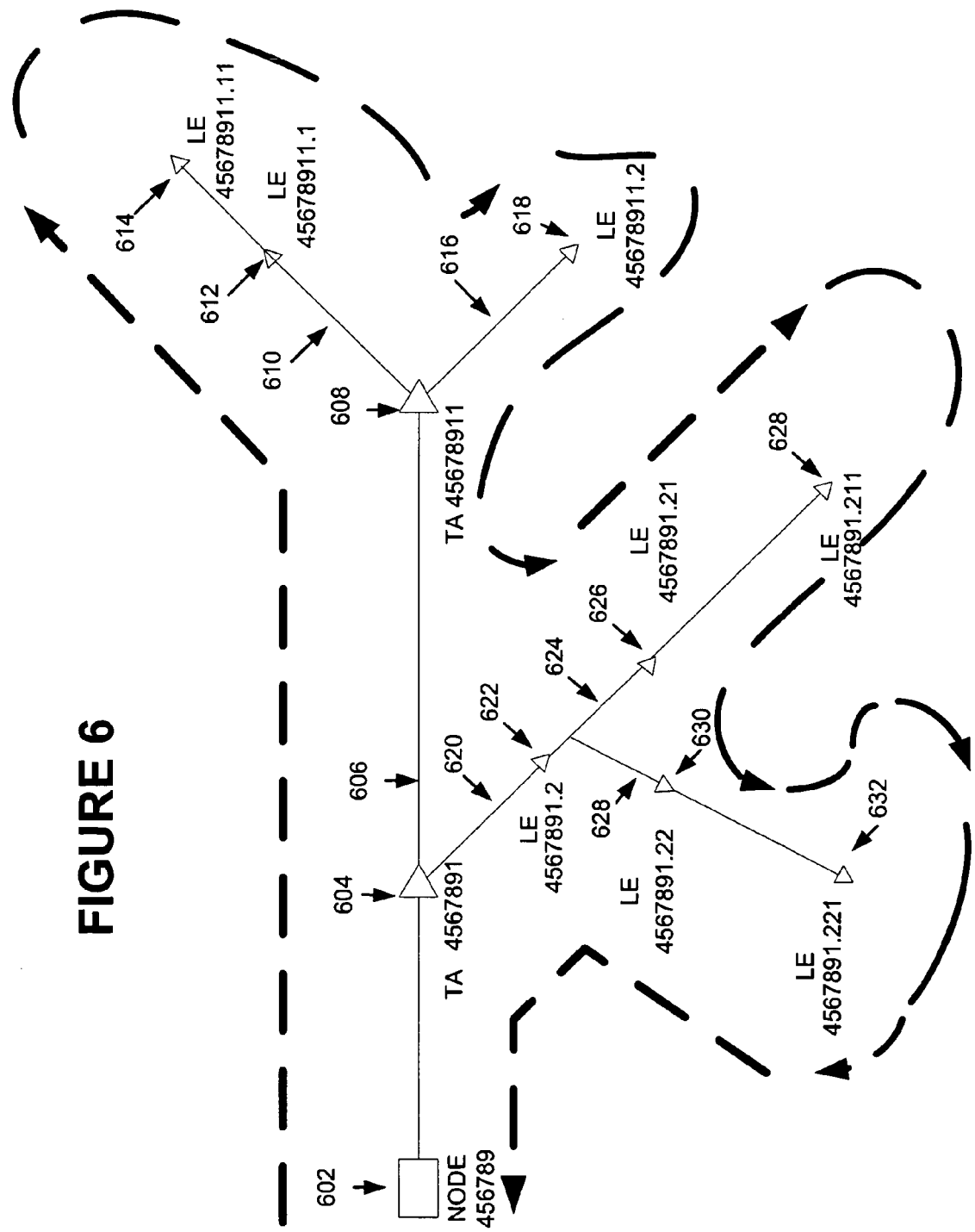
FIG. 6 is a process flow diagram illustrating a numbering method according to an embodiment.

FIG. 6 is a process flow diagram of numbering method according to an embodiment. The identifier assignment process begins at node 456789 (marker 602) and "walks" down a network cascade. The process identifies a trunk amplifier connected to node 456789 (marker 604) and assigns the trunk amplifier identifier 4567891 according the numbering methodology described above.

Trunk amplifier 4567891 branches twice. A first branch from trunk amplifier 4567891 (marker 606) is followed. The process continues down the cascade to a second trunk amplifier connected to first trunk amplifier 4567891 (marker 608) and assigns this trunk amplifier identifier 45678911 according the numbering methodology described above.

Trunk amplifier 45678911 also branches twice. A first branch from second trunk amplifier 45678911 (marker 610) is followed to a line extender (marker 612). The line extender is assigned the identifier 45678911.1. The branch is followed by a line extender (marker 614) that is assigned identifier 45678911.11 according the numbering methodology described above.

The line extender 45678911.11 marks the end of the branch. The process then "walks" up the branch until an unmarked branch is reached (marker 616). This is the second branch off of the second trunk amplifier 45678911. This branch is followed to a line extender that is assigned identifier 45678911.2 according the numbering methodology described above (marker 618). The line extender 45678911.2 marks the end of the second branch off of trunk amplifier 45678911.

The process then "walks" up the branch until an unmarked branch is reached (marker 620). This is the second branch off of the first trunk amplifier 4567891. This branch is followed to a line extender (marker 622) that is assigned identifier 4567891.2 according the numbering methodology described above.

Line extender 4567891.2 is connected to two branches. A first branch from line extender 4567891.2 (marker 624) is followed to a line extender (marker 626). This line extender is assigned identifier 4567891.21 according the numbering methodology described above. Line extender 4567891.21 is connected to a line extender (marker 628). This line extender is assigned identifier 4567891.211 according the numbering methodology described above. Line extender 4567891.211 marks the end of this branch.

The process then "walks" up the branch until an unmarked branch is reached (marker 628). This is the second branch off of line extender 4567891.2. This branch is followed to a line extender (marker 630) that is assigned identifier 4567891.22 according the numbering methodology described above. From line extender 4567891.22, the second branch off of line extender 4567891.2 is followed to a line extender (marker 632). This line extender is assigned identifier 4567891.221 according the numbering methodology described above. Line extender 4567891.221 marks the end of this branch.

The process then "walks" up the branch. However, at this point all devices on all branches have been marked. The process arrives at node 456789. If other cascades emanate from node 456789 (none illustrated), the process is repeated for each such cascade. Otherwise, the process terminates.

Figure 3:
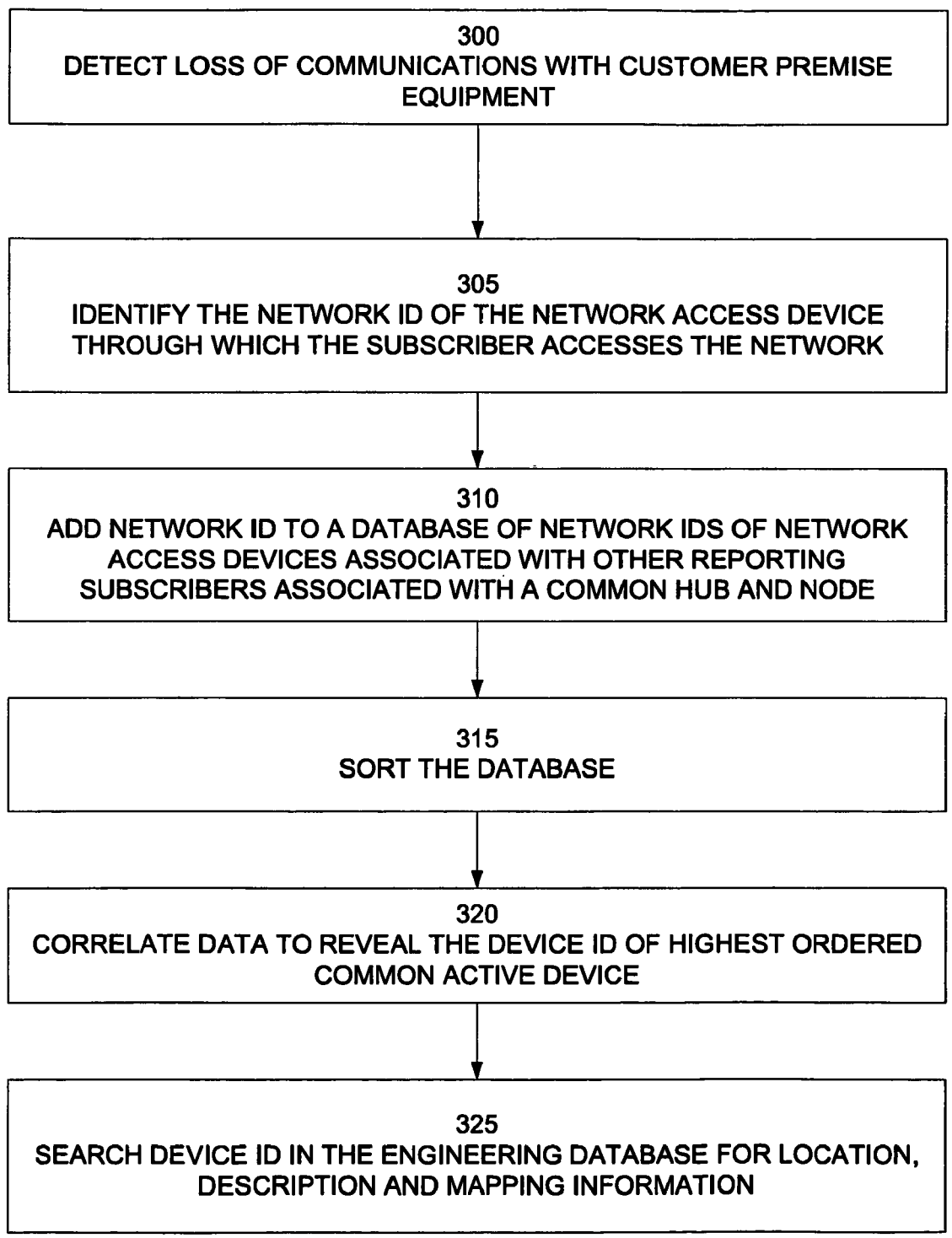
FIG. 3 illustrates of a flow of a process for isolating a fault in a subscriber network according to an embodiment.

FIG. 3 illustrates a block diagram of a flow of a process for isolating a fault in a subscriber network according to an embodiment of the present invention. A loss of communications between a head end and a customer premises equipment is detected 300. In an embodiment of the present invention, the loss detection is accomplished by polling active subscriber devices (e.g., two-way set top boxes, subscriber modems) and waiting for a reply. A failure of a device to respond after a fixed period of time is indicative of a potential fault in the cascade leading to that subscriber's interface.

The subscriber account number is used to identify the network identifier of the LAD through which the subscriber accesses the network 305. The network identifier of the network access device associated with the reporting subscriber is added to a database comprising the network identifier of network access devices associated with other reporting subscribers associated with a common hub and node 310. The database is sorted 315 and the data is correlated to reveal the device identifier of highest ordered common active device 320. The device identifier is searched in the engineering database for location, description and mapping information 325.

Figure 4:
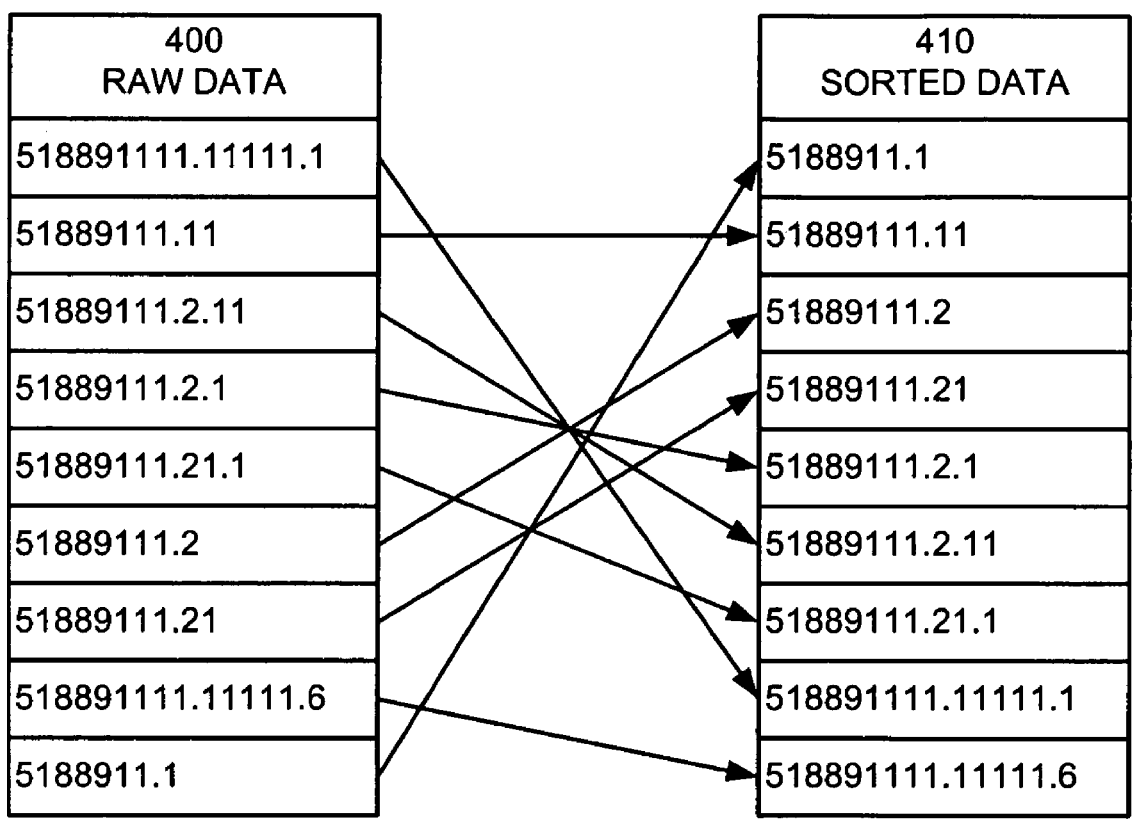
FIG. 4 illustrates the results of a sorting process performed on data acquired from a LAD numbered network according to an embodiment of the present invention.

FIG. 4 illustrates the results of a sorting process performed on data acquired from a LAD numbered network according to an embodiment of the present invention. As previously indicated, fault isolation is accomplished by in an automated fashion by a processor that executes instructions stored on an appropriate media. By way of illustration and not as a limitation, the media may be a hard drive, non-volatile memory, a cd-rom, and magnetic media. The instructions cause the processor to correlate trouble reports among subscribers with network devices common to those subscribers affected by a fault. Raw data 400 is sorted in ascending order according to sorting rules that order values in the following order: space—separator—number—letter. The sorted raw data 410 reveals a potential fault in amplifier 5188911.1.

In another embodiment of the present invention, raw data 400 is further processed after the sorting is completed. By way of illustration and not as a limitation, successive single place "right trim" string operations performed on a given device number may be used to identify successive upstream devices. "Wildcard" string searches performed on a device number may be used to identify either all downstream devices or only the adjacent downstream devices depending on the search type. Wildcard string searches performed on a device number may be used to identify the customers impacted by the device. Wildcard queries that include the decimal location may be used to select customers and devices connected to the distribution outputs of a particular trunk while ignoring other downstream devices and customers connected to the trunk output.

Figure 7A:
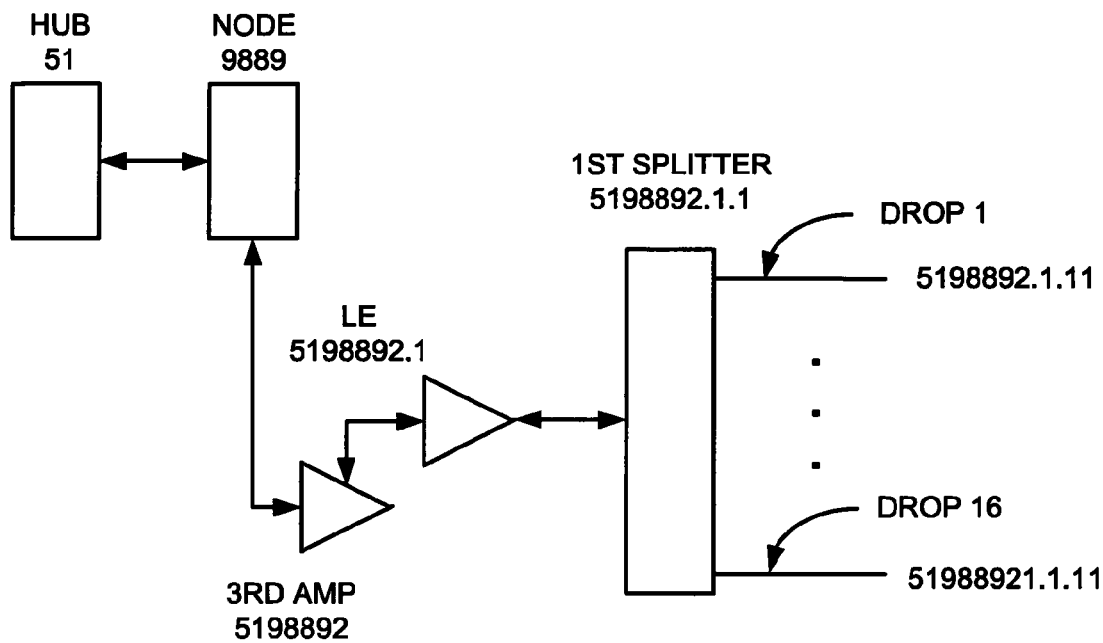
FIG. 7A illustrates a last active device numbering system applied to a splitter according to an embodiment.

In other embodiments, the numbering scheme is extended to allow for levels of "granularity" at the end of a branch. In one embodiment, the numbering system described above is extended in a three tier network (trunking, distribution, and passive components) to allow for identification of branches in excess of 9. By way of illustration, FIG. 7A illustrates a 16-port splitter at the end of a branch according to an embodiment. In this embodiment, the splitter follows a line amplifier (5198892) and a line extender (5198892.1) and receives the identifier 51988921.1.1 (selective bolding used for clarity). The splitter provides 16 distinct drops to subscribers. Under the numbering scheme described above, each of these drops would be assigned the same number as the splitter (51988921.1.1).

Figure 7B:
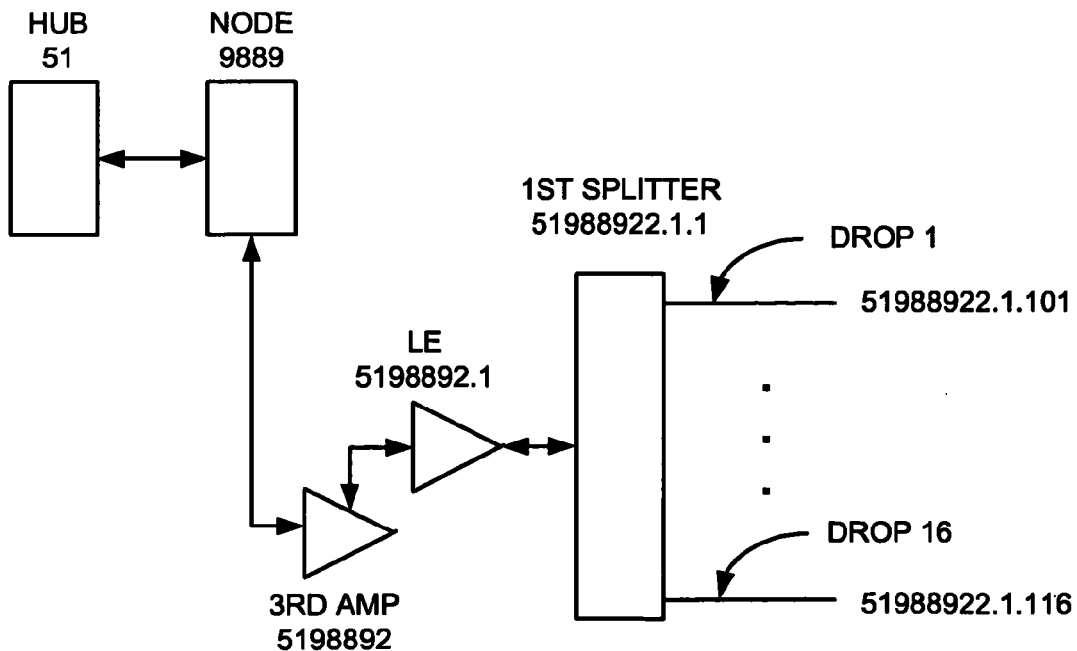
FIG. 7B illustrates an extended last active device numbering system applied to a splitter according to an embodiment.

FIG. 7B illustrates the use of a "zero" to provide drops that are discretely identifiable. In this embodiment, the first drop receives the identifier 51988921.1.101 (selective bolding used for clarity). The last drop would be assigned 51988921.1.116 (selective bolding used for clarity).

Figure 8:
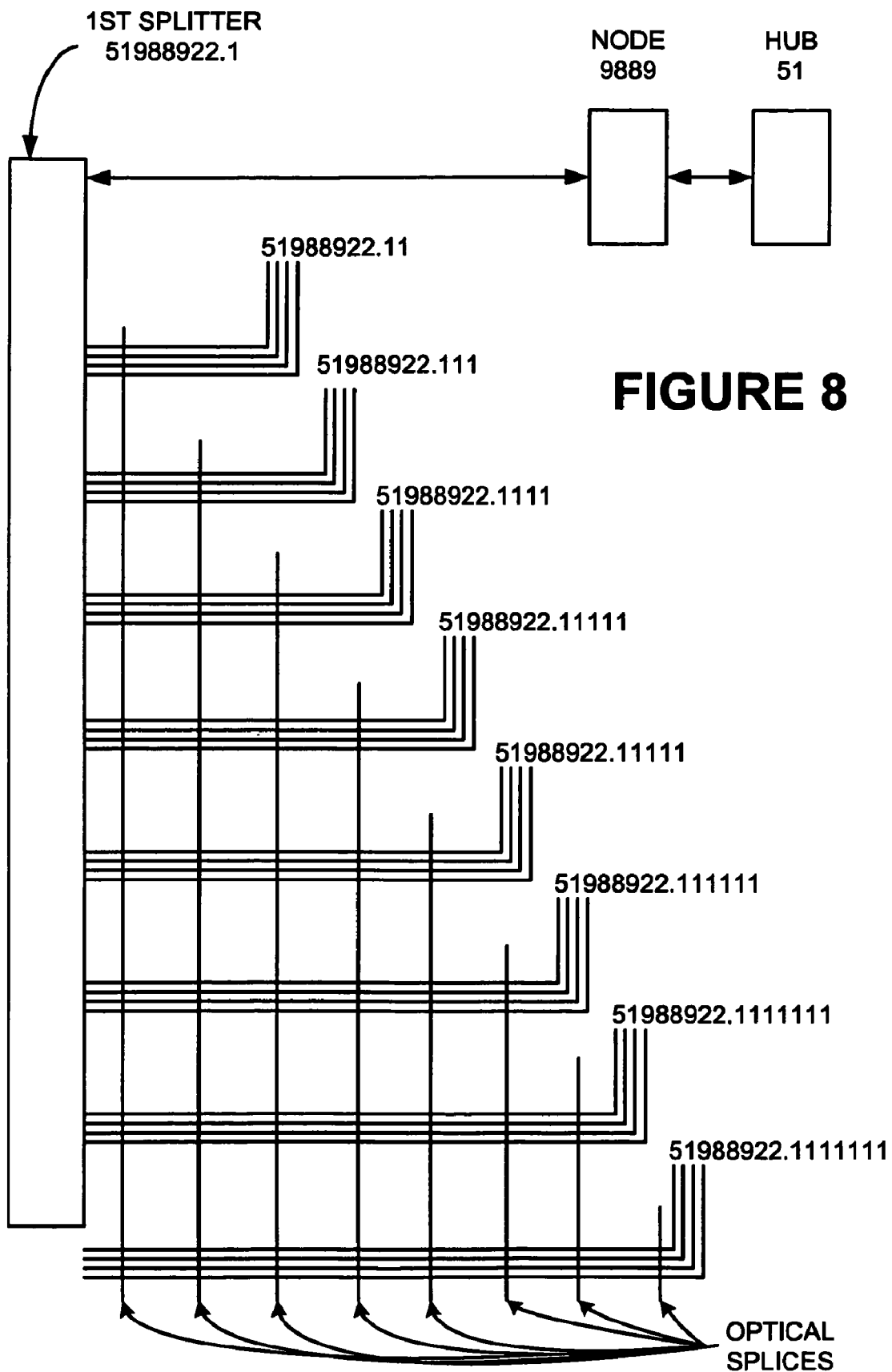
FIG. 8 illustrates a last active device numbering system applied to an optical splitter according to an embodiment.

FIG. 8 illustrates the identifiers of branches emanating from a 32-port optical splitter according to an embodiment. Optical networks are distinguishable from cable networks in that optical cascade trunk amplifiers and line extenders are not used. Amplifiers are connected directly to splitters. In an embodiment, the numbering scheme uses a single character to mark the transition from a fiber trunk to a passive component (e.g., a splitter). As illustrated in FIG. 8, the optical splitter follows a hub and a node and receives the identifier 51988921.1 (selective bolding used for clarity). The optical splitter branches in groups of four from eight discrete splices or connectors. The first splice and the four branches that emanate from that splice are identified as 51988921.11 (selective bolding used for clarity). The next splice also emanates from the first splice. This splice and the branches that emanate from it receive the identifier as 51988921.111 (selective bolding used for clarity). The third splice is identified as 51988921.1111 and the fourth splice is identified as 51988921.11111 (selective bolding used for clarity). This pattern continues until the eighth splice is reached and assigned identifier 51988921.111111111 (selective bolding used for clarity). Thus, the granularity of this device is 4 branches.

The system and methods described herein may be applied to a variety of networks. For example, an IP network may be number using one or more separators to distinguish transitions from network components at a selected functional level.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

We claim:

1. A method for isolating a fault in a subscriber network comprising: an identifier assignment processor identifying devices in the network by assigning a device identifier comprising:

a first character field comprising a hub identifier;

a second character field concatenated with the first character field, wherein the second character field comprises a node identifier; subsequent character fields sequentially concatenated beginning with the second character field, wherein a subsequent character field comprises a cascade number and wherein the value of the cascade number identifies a branch of the network relative to a device from which the branch emanates;

a first separator interposed into the device identifier before a subsequent character field indicative of a branch from a first level active device that terminates at a second level active device; and a second separator interposed into the device identifier before a subsequent character field indicative of a branch from an active device that terminates at a passive device;

wherein the assigned device identifier facilitates isolating a failed network device in the network.

2. The method for isolating a fault in a subscriber network of claim 1, wherein assigning a device identifier comprising a second character field concatenated with the first character field comprises assigning a device identifier comprising a second character field concatenated to the right of the first character field.

3. The method for isolating a fault in a subscriber network of claim 1, wherein assigning a device identifier comprising a second character field concatenated with the first character field comprises assigning a device identifier comprising a second character field concatenated to the left of the first character field.

4. The method for isolating a fault in a subscriber network of claim 1, wherein the first level active device comprises a bridger/amplifier.

5. The method for isolating a fault in a subscriber network of claim 1, wherein the second level active device is selected from the group consisting of a line extender and an apartment amplifier.

6. The method for isolating a fault in a subscriber network of claim 1, wherein the passive device comprises a line tap.

7. The method for isolating a fault in a subscriber network of claim 1, wherein the passive device comprises a single input to many output splitter and wherein the subsequent character fields of the splitter outputs are assigned two character identifiers numbered sequentially.

8. The method for isolating a fault in a subscriber network of claim 1, wherein the network is a fiber network and the passive device comprises a single input optical splitter having "m" outputs grouped according to "n" splices each assigned a group character fields and wherein the "n" group character fields are concatenated sequentially.

9. The method of claim 1, wherein the subscriber network is selected from the group consisting of a cable network, a fiber network, a satellite network, and a packet-switched network.

10. The method of claim 1, wherein the subscriber network is selected from the group consisting of a cable network, a fiber network, a satellite network, and a packet-switched network.

11. A system for isolating a fault in a subscriber network comprising:

a correlator, wherein the correlator comprises instructions for:

identifying non-responsive subscriber devices connected to the network through an active device;

obtaining a device identifier of the last active device through which each non-responsive subscriber device connects to the network, wherein the device identifier comprises:
- a first character field comprising a hub identifier;
- a second character field concatenated with the first character field, wherein the second character field comprises a node identifier;
- subsequent character fields sequentially concatenated beginning with the second character field, wherein a subsequent character field comprises a cascade number and wherein the value of the cascade number identifies a branch of the network relative to a device from which the branch emanates;
- a first separator interposed into the device identifier before a subsequent character field indicative of a branch from a first level active device that terminates at a second level active device; and
- a second separator interposed into the device identifier before a subsequent character field indicative of a branch from an active device that terminates at a passive device;

correlating the last active device identifiers associated with the non-responsive subscriber devices to identify a furthest upstream active device as a likely common cause of the non-responsiveness of the non-responsive subscriber devices.

12. The system of claim 11, wherein the second character field is concatenated to the right of the first character field.

13. The system of claim 11, wherein the second character field concatenated with the first character field is concatenated to the left of the first character field.

14. The system of claim 11, wherein the first level active device comprises a bridger/amplifier.

15. The system of claim 11, wherein the second level active device is selected from the group consisting of a line extender and an apartment amplifier.

16. The system of claim 11, wherein the passive device comprises a line tap.

17. The system of claim 11, wherein the passive device comprises a single input to many output splitter and wherein the subsequent character fields of the splitter outputs are assigned two or more character identifiers numbered sequentially.

18. The system of claim 11, wherein the network is a fiber network and the passive device comprises a single input optical splitter having "m" outputs grouped according to "n" splices each assigned a group character fields and wherein the "n" group character fields are concatenated sequentially.

* * * * *